(12) United States Patent
Hart et al.

(10) Patent No.: US 9,390,450 B1
(45) Date of Patent: Jul. 12, 2016

(54) SOCIAL FILE STORAGE

(75) Inventors: Michael Andrew Hart, Farmington, CT (US); Anantharaman Ganesh, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/404,922

(22) Filed: Feb. 24, 2012

(51) Int. Cl.
*G06F 15/16* (2006.01)
*G06Q 30/06* (2012.01)
*G06F 3/0481* (2013.01)

(52) U.S. Cl.
CPC .......... *G06Q 30/0643* (2013.01); *G06F 3/0481* (2013.01)

(58) Field of Classification Search
CPC .............. G06F 17/30867; G06F 3/147; G06F 17/30572; G06F 17/40; G06F 21/10; G06F 2221/2115; G06F 21/335; G06F 3/0481; G06F 2221/2149; G06F 3/048; G06F 3/04815; G06F 3/0484; G06F 2209/545; G06Q 30/0251; G06Q 30/0269; G06Q 10/10; G06Q 10/06; G06Q 10/107; G06Q 30/0643; H04N 21/25891; H04N 21/44222; H04N 21/472; H04N 1/00151; H04N 2201/3273; H04N 21/4532
USPC ........................................................ 709/203
See application file for complete search history.

(56) References Cited

U.S. PATENT DOCUMENTS

| | | | |
|---|---|---|---|
| 7,979,494 B1 * | 7/2011 | Golovin et al. | 709/206 |
| 2002/0147805 A1 * | 10/2002 | Leshem et al. | 709/223 |
| 2003/0074342 A1 * | 4/2003 | Curtis | 707/1 |
| 2005/0192008 A1 * | 9/2005 | Desai et al. | 455/435.2 |
| 2007/0076245 A1 * | 4/2007 | Sugimoto et al. | 358/1.15 |
| 2007/0083536 A1 * | 4/2007 | Darnell et al. | 707/101 |
| 2010/0030645 A1 * | 2/2010 | Watanuki et al. | 705/14.53 |
| 2011/0179380 A1 * | 7/2011 | Shaffer | G06F 3/04883 715/781 |
| 2012/0246596 A1 * | 9/2012 | Ording | G06F 3/0481 715/799 |
| 2012/0294592 A1 * | 11/2012 | Look | G11B 27/034 386/297 |
| 2013/0007590 A1 * | 1/2013 | Rivera | G06F 3/0481 715/234 |
| 2013/0117353 A1 * | 5/2013 | Wong et al. | 709/203 |

* cited by examiner

*Primary Examiner* — Dustin Nguyen
*Assistant Examiner* — Hao Nguyen
(74) *Attorney, Agent, or Firm* — Patent Law Works LLP

(57) ABSTRACT

The present disclosure provides for determining whether object accesses that occur in a file system qualify as relevant events, and displaying information about relevant events in a social file storage interface. A social file storage interface can provide a news feed of recent relevant events, a subscription list that displays information about relevant events performed by colleagues, and an access map that displays a visual representation of relevant events and relevant objects in the file system. An object access qualifies as a relevant event if an attribute of the object access satisfies relevance criteria defined by a user. If a user is not authorized to access an object, a relevant event pertaining to that object will not be displayed to the user in the social file storage interface. An object can also be accessed and opened from within the social file storage interface.

21 Claims, 10 Drawing Sheets

SOCIAL FILE STORAGE

FIELD OF THE INVENTION

This invention relates generally to file systems and, more particularly, to displaying information gathered from a file system.

DESCRIPTION OF THE RELATED ART

A file system is responsible for organizing and managing files and directories stored in a resource of a computing system. Users of the computing system can access files and directories of the file system via a graphical user interface of a file manager application, such as Windows Explorer. A file manager application displays basic information about a file, such as a file name and a file type. However, a file manager application fails to display information about events that occur in the file system, such as a colleague or supervisor viewing a particular file of the user.

BRIEF DESCRIPTION OF THE DRAWINGS

The present invention may be better understood, and its numerous objects, features and advantages made apparent to those skilled in the art by referencing the accompanying drawings.

Figure 1:
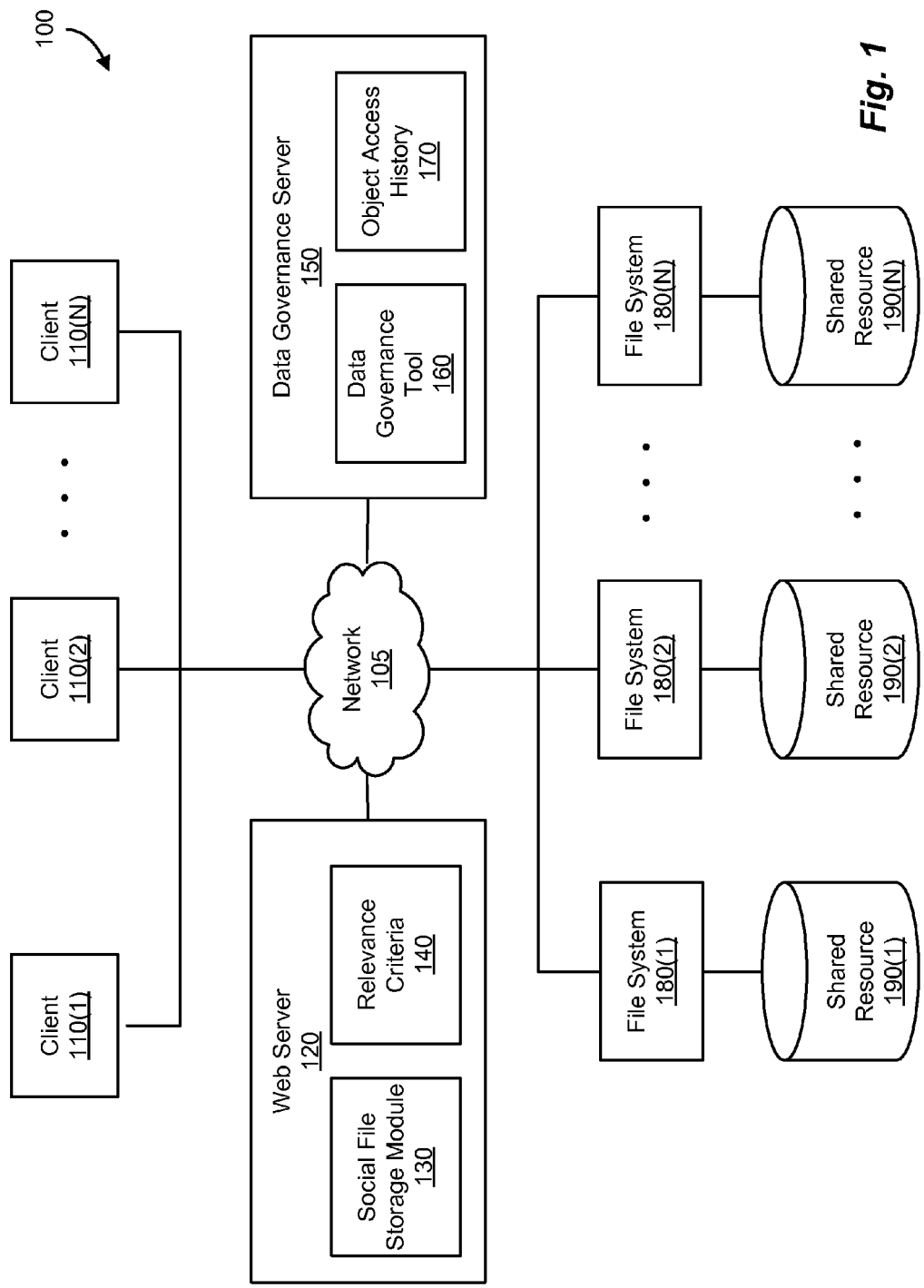
FIG. 1 is a block diagram illustrating relevant components of an example storage system that can include a social file storage module, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

FIG. 1 is a block diagram illustrating relevant components of an example storage system 100 that can include a social file storage module. Storage system 100 includes a network 105 that communicatively couples one or more client devices 110(1)-(N), a web server 120, a data governance server 150, one or more file systems 180(1)-(N), and one or more shared resources 190(1)-(N). Each component is discussed in further detail below.

One or more clients devices 110(1)-(N), also referred to herein as client systems and/or clients, can be implemented using, for example, a desktop computer, a laptop computer, a workstation, a server, or the like. An example of such computing devices is described subsequently, in connection with FIG. 8. One or more clients 110(1)-(N) are configured to access one or more shared resources 190(1)-(N) via network 105. An example of network 105, which can be used by clients 110(1)-(N) to access the shared resources 190(1)-(N), is a local area network (LAN) utilizing Ethernet, IEEE 802.11x, or some other communications protocol.

One or more shared resources 190(1)-(N), also referred to herein as network shares, can be implemented as network attached storage (NAS), file servers, or storage filers. A shared resource 190 can be implemented as a single storage device or a collection of storage devices. A shared resource 190 can also be implemented as a storage area network (SAN), which couples remote storage devices to a server (e.g., a storage server), such that the remote storage devices appear as locally-attached storage devices to the server's OS, for example. A shared resource 190 can include a data volume, such as a cluster shared volume.

In light of the present disclosure, it will be appreciated that shared resources 190 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, storage system 100 and network 105 can include other components such as routers, firewalls and the like that are not germane to the discussion of the present disclosure and will not be discussed further herein. It will also be appreciated that other configurations are possible.

The letter N is used to indicate a variable number of devices or components. For example, a variable number of clients, file systems, and shared resources are implemented in the storage system. Although the letter N is used in describing a variable number of instances of each of these different devices and components, a repeated use of the letter N does not necessarily indicate that each device and component has a same number of N instances implemented in the storage system.

Each file system 180(1)-(N) (generically referred to as file system 180) is coupled to a corresponding shared resource 190 (generically referred to as shared resource 190). Although each file system 180 and corresponding shared resource 190 are shown as being logically distinct in FIG. 1, each file system 180 resides on a shared resource 190. Each file system 180 can also be implemented as a client/server application, with a client (not shown) of the file system residing on a client device, and a server (not shown) of the file system residing on a storage server (e.g., a file server or network attached storage (NAS)).

Each file system 180 is responsible for organizing and managing files and folders in a corresponding shared resource 190, also referred to herein as a network share, by providing a structure in which files of the shared resource are stored. For purposes of this disclosure, folders are considered to be a special type of file, and thus references made herein to files can include special files such as folders. One or more client devices 110(1)-(N) (referred to generically as client device 110) can access a shared resource 190 via network 105 by communicating with the file system 180 responsible for the shared resource. A file system 180 can be, for example, a file system on a local or a remote computer, a shared file system, or a cluster file system. The file system 180 maintains a consistent view of the shared resource 190 across the one or more client devices 110 by, for example, controlling accesses of the client devices to the shared resource 190 (e.g., a shared file system arbitrates file accesses to avoid access collisions that would otherwise result from multiple client devices trying to access a file at the same time). A file system (e.g., Concurrent Version System) can also maintain a consistent view by tracking versions of a file (e.g., by storing a current version of a file on a server, and allowing a client to "check out" a copy of a file and "check in" changes made to the file).

A file system also stores information or attributes about each file in a shared resource, as further discussed below. While the social file storage interface discussed herein can communicate with file systems generally, the social file storage interface especially benefits from information provided by shared file systems. Since files can be accessed by multiple users in a collaborative manner in shared file systems, the information recorded by a shared file system can include information about accesses performed by multiple users to a single file, in addition to accesses performed by a single user to multiple files. Thus, the information provided by a shared file system to the social file storage interface especially benefits a user who wishes to track collaborative accesses to a single file.

A file system 180 also communicates with a directory service (not shown) that provides user access control. A directory service, such as Active Directory® (available from Microsoft Corporation of Redmond, Wash.) or LDAP (Lightweight Directory Access Protocol), serves as a central location for network administration and security (e.g., performing authentication and authorization of users in the network). A directory service provides a hierarchical arrangement of information about resources (e.g., servers, NAS, printers, and the like) and security principals (e.g., users, groups of users, and the like). Each security principal is assigned a globally unique identifier (GUID) that identifies the security principal. Users can be associated into groups, and each group can also be assigned a GUID and access permissions. The user information of a directory service (e.g., GUIDs and access permissions) can be stored in a file system, which uses the user information to enforce access permissions to files. Once a user logs into a client device, the user is provided a GUID by the directory service, and an operating system uses the GUID to determine whether the user should be allowed or denied access to a computer or other shared resource. The user information of a directory service can also be stored locally to the social file storage module (not shown) for display purposes, discussed further below.

User access control in a directory service defines how different security principals (e.g., users) can use resources (e.g., shared resources) via access permissions. Different levels of access can be set for a user with respect to a resource (e.g., full control, read, write, or no access to the resource). Access permissions are described in access permission settings, where each user can be associated with one or more access rights to files. These access rights can be implemented in the form of password protection, certificates, permission bits, access control lists, or other secure capabilities.

Data governance server 150 includes a data governance tool or application 160 such as Symantec™ Data Insight (available from Symantec Corporation of Mountain View, Calif.), Symantec™ Network Monitor (Symantec Corporation of Mountain View, Calif. and/or other data loss prevention software, which is responsible for gathering information about accesses made to files in the one or more file systems 180. Logical items such as files are herein referred to as objects. Objects can include files, such as documents, folders, components of databases, tables, and the like. A data governance tool 150 can monitor a file system 180 and record information about object accesses performed in the file system. A data governance tool, can detect object accesses by, for example, monitoring network traffic or by scanning file systems for information about file accesses.

Information about an object access includes one or more attributes that describe the object access. Upon detection of an object access in a file system, a data governance tool can gather attributes of the object access from the file system. Attributes can include access attributes (e.g., attributes related to a user that accesses the object), such as the GUID of the user performing the access, a type of access performed (e.g., read, write, copy), an IP address of a client performing the access, a location or identification of a network share in which the object is stored, and a time the object is accessed. Attributes can also include object attributes (e.g., attributes related to the file being accessed), such as the name of the object that was accessed. A user can customize which attributes are captured by the data governance tool (e.g., by specifying which attributes the data governance tool should gather from the file system). A user can also define supplementary attributes in addition to those already defined in the data governance tool. Supplementary attributes can record supplemental data related to a user performing an object access, such as a name of a supervisor of the user performing the access, an electronic mail address of the supervisor, and/or department of the supervisor. Attributes that have been captured by the data governance tool can be stored in an object access history store 170, located at data governance server 150. Each entry of the object access history store contains attributes that are associated with an object access.

Example access attributes include, but are not limited to: a data user (the data user is the user who has most frequently accessed the object), data user last access time (the last time the data user accessed the object), data user access count (the number of times the data user accessed the object), most active users, most active readers, most active writers, read and write counts for each of the most active users, readers, and writers, last modified by (the last data user to modify the object), last accessed time (the last time a data user accessed the object), number of read accesses across all users, number of write accesses across all users, the first time that access history was collected for this object, and business owner (as defined in data governance tool). Example object attributes include, but are not limited to: object total reads (total number of read accesses for the object), object total writes (total number of write accesses for the object), object last modified by (the last data user who modified the object), object last access time (the last time the object was accessed), object access history start date (the first time that access history for the object was collected), and an object's ancestor history.

Web server 120 includes a social file storage module 130, which is configured to generate a social file storage interface for a user. A social file storage interface is a user interface that displays information about object accesses that are relevant to a user. These object accesses, which are relevant to a specific user, are also referred to herein as relevant events or as events. In one embodiment, a social file storage interface can provide functionalities that can generate three views: a news feed that displays information about relevant events that occur in the file system, a subscription list that displays information about relevant events performed by one or more colleagues in the file system, and an access map that displays a visual representation of relevant events performed in the file system. Other embodiments can implement other views instead of and/or in addition to these views, and some embodiments can implement a different number of functionalities. Examples of a social file storage interface are described in more detail below with respect to FIGS. 4, 5, and 6A-6C.

A social file storage interface also takes user information (e.g., GUIDs and access permissions) into consideration when displaying information about relevant events. The user information can be stored locally to a social file storage module. If a user is not authorized to access (e.g., to view) an object, information about an event relating to that object will not be displayed in the social file storage interface for that user. To ensure that the correct access rights for the user are applied, the social file storage interface can require the user to log in at the client device before displaying the social file storage interface. A user can log in by using his GUID or by using an associated user name. Changes made to the user information can be displayed by a social file storage interface as an event, an alert, or a notification. For example, if a colleague changes permissions to a file that the user accesses regularly, a notification indicating that the access permissions have been changed can be displayed to the user in the social file storage interface. Clicking on the notification can display the new permissions or indicate the changes made to the permissions.

In one embodiment, a social file storage module 130 can be implemented as a web server that generates a social file storage interface as one or more web pages. Social file storage module 130 can generate and transmit the social file storage interface as web page information across network 105 to a client device 110. The social file storage interface can then be rendered in a web browser located at a client device 110. In one embodiment, the above-discussed functionalities are implemented entirely at the web server, which generates appropriate web pages based upon the particular view of the social file storage interface being requested at a given time. In other embodiments, the implementation of these functionalities is distributed between the web server and web client. For example, the social file storage interface rendered in a web page can include embedded applets that provide the above-discussed functionalities. In one such embodiment, the social file storage module 130 can be implemented as a plug-in or software component for a web browser, where the plug-in enables the web browser to generate and/or display a social file storage interface at the client device. In an alternative embodiment, the social file storage module 130 can be implemented as a standalone application component that communicates with a client device 110 over network 105 and generates a dedicated social file storage interface at the client device. In yet another alternative embodiment, a social file storage module 130 can be implemented as a plug-in or software component for a data governance tool, where the plug-in enables the data governance tool to generate a social file storage interface at the client device in a user interface of the data governance tool.

Web server 120 also includes a relevance criteria store, which stores relevance criteria received from one or more users of one of the client devices 110. Relevance criteria are used to determine which file accesses are relevant events with respect to a particular user. In relevance criteria, each user can identify target attributes of object accesses in which the user is interested, such as by identifying colleagues (e.g., by specifying the GUIDs of users, including the user viewing the social file storage interface), objects (e.g., by specifying file names), or other access and file attributes discussed above that the user finds relevant, such as particular actions or operations performed by a colleague or performed on an object. In other words, relevance criteria indicate that the user wishes to be notified of any object accesses pertaining to the relevant colleagues and objects. A user can define relevance criteria to identify events that have an impact on the user's work. Relevance criteria can be used to identify and display events that are related to (but are not limited to): colleagues who consume content that the user has created (e.g., a supervisor read a file created by the user); colleagues who create content in a folder or network share that the user has worked out of recently or works out of regularly; colleagues in my group under the same manager; colleagues who are in my social network, as determined by file usage (e.g., colleagues who access a same object as the user); colleagues who share the user's occupation; objects that the user is interested in consuming (e.g., a file created by a colleague that the user is interested in reading); and object accesses in network shares that the user accesses regularly. Relevance criteria can also be computed based on social network analysis on collaborative work, discussed below in reference to the analysis module. Computing relevance criteria from social network analysis does not require that a user explicitly define or provide relevance criteria.

Target attributes of the relevance criteria are compared with attributes of object accesses. An object access that is associated with an attribute that matches one of the attributes identified in the relevance criteria is determined to meet the relevance criteria, and qualifies as a relevant event. Relevant events are displayed in the social file storage interface. Relevance criteria is further discussed below, in reference to the comparison module of FIG. 2.

Relevance criteria can also indicate colleagues and objects that the user does and does not find relevant. Thus, a user can select a set of one or more files or a set of users that the user wants to exclude from the social file storage interface. For example, a user in the engineering department of the company may not wish to see any updates pertaining to files primarily used by the marketing department. Object accesses pertaining to non-relevant colleagues and files are not displayed in (i.e., are excluded from) the social file storage interface.

Figure 2:
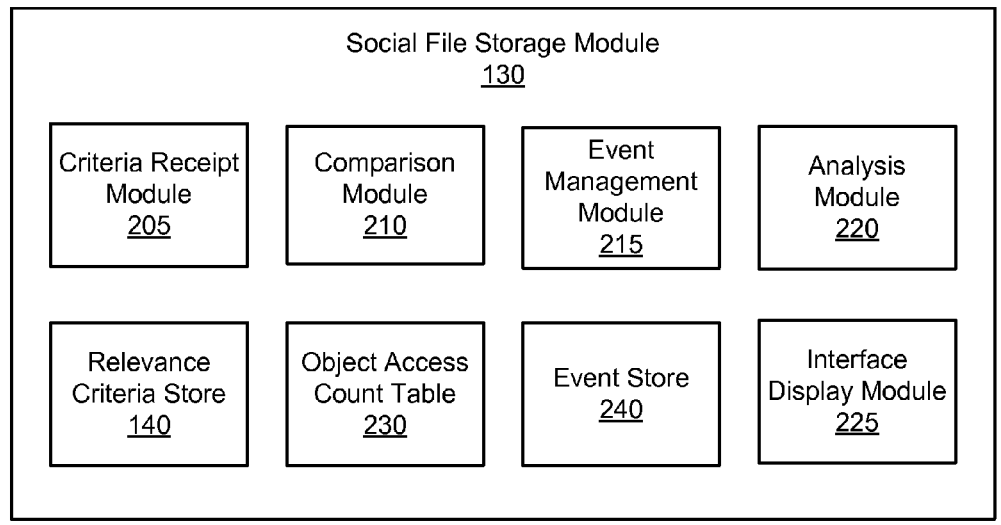
FIG. 2 is a block diagram illustrating relevant components of an example social file storage module, according to one embodiment.

FIG. 2 is a block diagram illustrating relevant components of an example social file storage module 130. A social file storage module 130 includes a criteria receipt module 205, a comparison module 210, an event management module 215, an analysis module 220, and an interface display module 225. A social file storage module 130 also includes a relevance criteria store 140, an object access count table 230, and an event store 240.

A criteria receipt module 205 is configured to receive relevance criteria from a user. Relevance criteria can be sent from a client device 110 to the social file storage module 130 via network 105. A criteria receipt module 205 can be coupled to a port or other interface of web server 120 (or other server on which social file storage module 130 is located) that is coupled to network 105, where the port is configured to receive relevance criteria from a client device 110. A criteria receipt module 205 can also be configured to store received relevance criteria in relevance criteria store 140. As shown in FIG. 1, relevance criteria store 140 can be local to social file storage module 120, where relevance criteria store 140 is communicatively coupled with criteria receipt module 205. In one embodiment, relevance criteria store 140 can be located within social file storage module 130, as shown in FIG. 2. In an alternative embodiment, relevance criteria store 140 can be located remotely from social file storage module 130.

In one embodiment, a user can define relevance criteria independently for each of the functionalities of the social file storage interface (e.g., news feed relevance criteria, subscription list relevance criteria, and access map relevance criteria). For example, a user can identify particular colleagues that the user wishes to follow in subscription list relevance criteria, can identify particular files that the user wishes to be notified about in the news feed relevance criteria, and can identify all members of his department (himself included) as relevant colleagues in the access map relevance criteria. Access map relevance criteria can be much broader than news feed and subscription list relevance criteria, where access map relevance criteria can indicate that all object accesses performed in one or more file systems are relevant to the access map, in order to accurately depict usage of the one or more file systems. An object access that possesses an attribute that matches one of the attributes identified in the news feed, subscription list, or access map relevance criteria is displayed in the corresponding view by the corresponding functionality. An identifier of the matched relevance criteria (criteria ID) can also be generated by the comparison module, which can be used to identify the corresponding view in which a relevant event should be displayed for a user.

A comparison module 210 is configured to communicate with object access history store 170 in order to compare relevance criteria of one or more users with object accesses stored in object access history store 170. A comparison module 210 can be coupled to a port or other interface of web server 120 (or other server on which social file storage module 130 is located) that is coupled to network 105, where the port is configured to receive object access history from a data governance server 150. Comparison module 210 can send a (search) request to the object access history store 170 (or to the data governance tool 160, if access to the object access history store is controlled by the data governance tool) for object accesses that have occurred within an immediately preceding time period (e.g., within the last seven days). The immediately preceding time period can be defined by a social file storage administrator. An object access is associated with a time stamp indicating when the object access occurred. The request can locate or identify object accesses that are associated with a time stamp (or set of time stamps) that falls within the immediately preceding time period. Comparison module 210 can retrieve attributes associated with the object accesses (i.e., information that describes the object accesses) from the object access history store, or can receive the attributes of the object accesses from the data governance tool (if access to the object access history store if controlled by the data governance tool). A comparison module 210 can include a buffer (not shown) to temporarily hold information about object accesses retrieved from object access history store 170.

Comparison module 210 can evaluate the object accesses by comparing the received attributes of an object access with target attributes identified in the relevance criteria stored in the relevance criteria store. If an attribute of the object access matches an attribute identified in the relevance criteria, the matching object access meets the relevance criteria and is determined to be a relevant event. Relevance criteria can be configured as individual criteria (in which case, satisfaction of any one criterion results in a relevant event), or as a combination of criteria (in which case, satisfaction of the combination of criteria results in a relevant event).

In one embodiment, comparison module can receive the minimum required attributes of object accesses to perform the evaluation (e.g., colleague name and object name). Once an object access is determined to meet the relevance criteria, additional attributes of the object access can be retrieved from the object access history store.

Comparison module 210 can determine whether all object accesses occurring within the immediately preceding time period have been evaluated (e.g., have been compared with relevance criteria). Thereafter, comparison module can perform incremental or periodic evaluations for object accesses that have later occurred (and thus have been later captured by the data governance tool). For example, comparison module can request object accesses that have occurred within the last day or within the last three hours, or however long since the last evaluation was performed. In one embodiment, a periodic evaluation may be performed continuously or near-continuously, where comparison module 210 retrieves object accesses as the data governance tool captures the object accesses. Such a continuous evaluation may require an outstanding request at the data governance tool, which informs the data governance tool to immediately send an object access to the comparison module once the object access is captured. Periodic evaluations help avoid superfluous re-evaluations of object accesses that have been previously evaluated by the comparison module. However, if a computation requires re-evaluating a previously evaluated object access (e.g., relevance criteria requires re-evaluation), the comparison module can do so.

An event management module 215 is configured to store and manage relevant events. A relevant event, or an object access determined to be relevant, can be communicated from comparison module 210 to event management module 215, where attributes of the relevant event is stored in an event store 240 (i.e., where attributes of the relevant object access are stored as attributes of the relevant event). An identifier of the matched relevance criteria can also be communicated to event management module and stored in the event store, which can be used to identify the corresponding view(s) in which a relevant event should be displayed. For example, if comparison module 210 determines that an object access meets relevance criteria for a news feed, then comparison module 210 can communicate a criteria identifier (criteria ID) to the event management module 215 that indicates that the object access has met news feed relevance criteria of a particular user and thus should be displayed in the news feed viewed by the particular user. The criteria ID may be a user/functionality pair that identifies an event should be displayed in one of the three views displayed to the user. The user can be identified by a GUID, and the view can be identified by a numerical value corresponding to one of the three views. The event store can be located externally from the social file storage module, where the event store is communicatively coupled to the event management module. In one embodiment, the event store is located within the social file storage module (e.g., within event management module 215).

Figure 3:
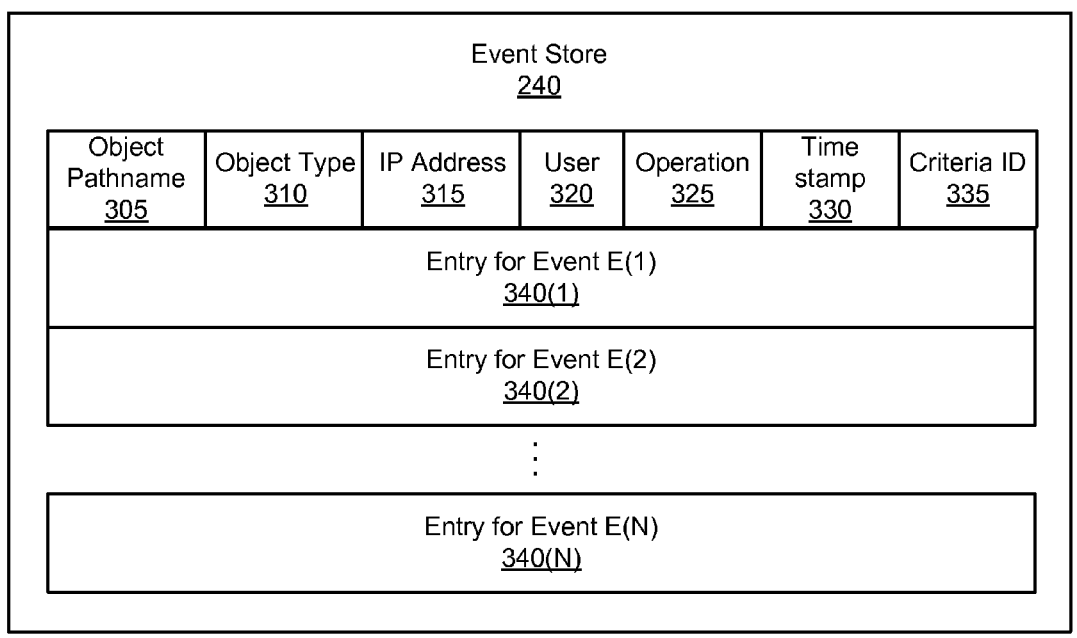
FIG. 3 is a block diagram illustrating relevant components of an example event store, according to one embodiment.

FIG. 3 is a block diagram illustrating relevant components of an example event store 240. Each entry 340 of an event store 240 contains attributes associated with an event. Since an event is a relevant object access, the attributes of the event are the same attributes of the relevant object access. Event store includes an object pathname 305, which provides the pathname of the object that was accessed, and an object type 310, which describes whether the object is a file or a folder. An object type 310 can also be network share specific. For example, object type can be document-library, which is an object type specific to SharePoint® servers (available from Microsoft Corporation of Redmond, Wash.). Event store also includes an IP address 315 of the client device from which the object access was captured (i.e., the IP address of the client device where the user opened the file).

Event store 240 includes a user 320, which identifies the user who performed the event (i.e., object access), and an operation 325, which identifies the particular operation performed (e.g., read, write, copy). A user 320 can be identified by a globally unique identifier (GUID) of a user. Event store also includes a time stamp 330 of when the event (i.e., object access) occurred, and a criteria ID 335 of the relevance criteria that was matched. The criteria ID is used to determine which functionality of the social file storage interface will display information about the event to a user in a corresponding view, as further discussed in reference to an interface display module 225 of FIG. 2.

A lifetime (not shown) is set for each relevant event entry when a relevant event is added to the event store. The relevant event is removed from the event store at the expiration of the lifetime. A lifetime allows a user to set a relevance period for events. In other words, a user can indicate that relevant events are relevant only for the relevance period (i.e., lifetime). For example, a lifetime may be set to one week, where the user wishes to view events in the social file storage interface that have occurred within the immediately preceding week. Once the event lifetime expires, the event is removed from the event store and the event is no longer displayed in the social file storage interface.

Returning to FIG. 2, an event management module 215 can log a relevant event added to the event store by incrementing an object access count for an object accessed in the relevant event. An object access count indicates a number of object accesses performed by a colleague for a particular object, where the object access count is associated with both the colleague and the particular object. Thus, an object that has been accessed by multiple colleagues will be associated with an object access count for each colleague. Similarly, a colleague that has accessed multiple objects will be associated with an object access count for each object that he accessed. An object access count can be stored with an associated colleague/object pair in an object access count table 230. A colleague can be identified in the object access count table by a GUID, and an object can be identified in the table by an object name (e.g., a file name). An object access count can be further specified for each type of operation performed on the object, so that separate object access counts are maintained for different operations (e.g., for read operations and for write operations. A summation of the object access counts specified for each type of operation equals the total number of object accesses for the object. When an event is removed from event store 240, event management module can decrement an object access count of the object associated with the event. Similarly, an object access count specified for a type of operation can be decremented, based on the type of operation indicated in the event.

An analysis module 220 can also be implemented in the social file storage module, which can be configured to anticipate events in which a user may be interested. Analysis module 220 analyzes the events stored in the event store and builds correlations. Correlations can be built between actions or events performed by a user's colleagues. For example, if a supervisor reads reports created by two employees, the employees may desire to be aware of each other's work. Each employee can receive a notice in the social file storage interface that indicates the other employee as a potential colleague to follow.

Analysis module 220 can also be configured to generate clusters of users or colleagues that can be suggested to a user as potential colleagues to follow. An association between two colleagues can be created if one colleague created content that another colleague read or contributed. Associations can be formed between multiple colleagues, creating a social network that captures the dynamic nature of the relationships between multiple colleagues. Colleagues can be suggested to the user via the news feed or subscription list functionalities of the social file storage interface. If a user chooses to accept any of these suggestions, the user's relevance criteria can be updated to reflect that the user is now interested in viewing events related to the newly-followed colleague(s).

Interface display module 225 is configured to access the event store and display events in the social file storage interface. An interface display module 225 can be coupled to a port or other interface of web server 120 (or other server on which social file storage module 130 is located) that is coupled to network 105, where the port is configured to communicate with a client device 110. Interface display module uses the criteria ID to determine which functionality of the social file storage interface will display information about the event to the user. For example, a user can define different relevance criteria for a news feed, a subscription list, and an access map. If an object access meets a user's relevance criteria for a news feed, an indication (i.e., criteria ID) that the object access has met news feed relevance criteria of the user can be stored in the event store. Interface display module 225 can access the event store, retrieve a criteria ID of an event that indicates news feed relevance criteria has been met, and thus determine that the event should be displayed in the news feed of the user. More than one criteria ID may be associated with an event, depending on whether the event met one or more functionality relevance criteria of one or more users. In other words, a single event may be associated with multiple criteria IDs, one for each user/functionality pair. Interface display module 225 can display an event in one or more of the views provided by the social file storage interface, as indicated by the criteria ID(s) associated with the event.

Interface display module 225 is also configured to access user information provided by a directory service to determine access permissions of a user. The user information of a directory service (e.g., GUIDs, access permissions) can be stored locally to the social file storage module and can be accessed by interface display module. Access permissions of a user have an overriding effect on events that will be displayed in the social file storage interface. If a user does not have authority to access a particular object, then an object access pertaining to that object will not be displayed in the social file storage interface for that user, even if the object access meets the user's relevance criteria. Since the object access qualifies as a relevant event, the relevant event will be stored in the event store. This is because the relevant event can be displayed in social file storage interfaces for other colleagues who have authority to access the particular object and who are also interested in the object access of the relevant event. Interface display module 225 refers to user access permissions to ensure that the events (i.e., relevant file and folder accesses) displayed in the social file storage interface pertain to objects to which the user has access.

In an alternative embodiment, information about substantially all object accesses performed in a file system can be stored in the event store 240 by the event management module, rather than only relevant events being stored in the event store. In such an embodiment, the comparison module 210 can provide the object accesses to the event management module 215, rather than providing only relevant events to the event management module. Alternatively, the event management module 215 can be coupled to a port or other interface of web server 120 (or other server on which social file storage module 130 is located) that is coupled to network 105, where the port is configured to receive information about the object accesses from a data governance server 150. Event management module 215 can also include a buffer to temporarily hold information about object accesses retrieved from object access history store 170.

The event store would store information about the stored object accesses in a same manner as the relevant events, as discussed above. For example, a lifetime can be set for each stored object access entry. An identifier of the matched relevance criteria (criteria ID) does not need to be generated upon addition of a stored object access entry to the event store, since the stored object access has not yet been determined to meet any criteria. The comparison module 210 can use relevance criteria defined by the user to determine relevant events from the stored object accesses. Interface display module 225 can then display the relevant events. For example, if a user wants to track accesses to a specific file, a user identifies the specific file in the relevance criteria, which is stored in the relevance criteria store. Comparison module can then evaluate the object accesses stored in the event store using the relevance criteria store to determine relevant events (i.e., object accesses to the specific file). Thus, the comparison module provides a filter capability to identify relevant events from accumulated object accesses stored in the event store. The relevant events are then provided to the interface display module, which displays the relevant events in one or more views provided by the social file storage interface, as discussed above. A criteria ID can be generated by the comparison module and provided to the interface display module when an object access is determined to be a relevant event. The criteria ID does not need to be stored in the event store, since the event store serves as a source of object accesses and can be re-evaluated at a later time.

Figure 4:
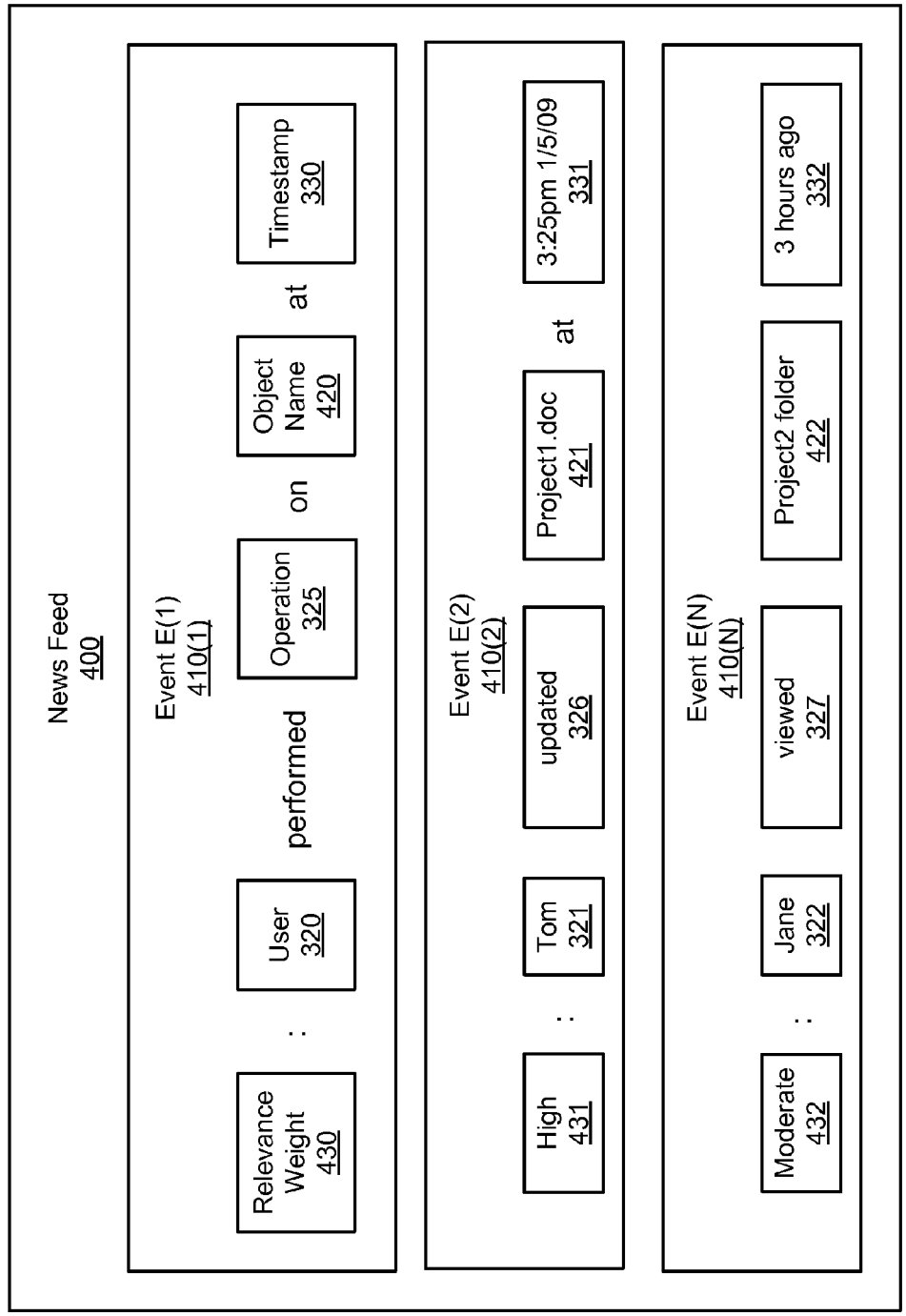
FIG. 4 is a block diagram illustrating relevant components of an example news feed of a social file storage interface, according to one embodiment.

FIG. 4 is a block diagram illustrating relevant components of an example news feed 400 that is displayed in a social file storage interface. A news feed can include a list of events, where events are displayed in entries of the list of events. Each list entry provides information about an event. Each event entry 410 can include a relevance weight 430, which is an aggregate weighted value associated with an event. An analysis module 220 can also be configured to determine a relevance weight from various weighted values associated with different attributes of an event, and can use the relevance weight in building correlations. For example, some operations performed on an object may be associated with a greater weighted value than other operations, which indicates a greater relevance to a user (e.g., if a user is more interested in a write operation than a read operation performed on a particular file). Some colleagues may be associated with a greater weighted value than other colleagues to indicate a greater relevance (e.g., if a user is more interested in events performed by a direct supervisor than by a same-level colleague). The weighted values associated with various attributes of an event can be aggregated to determine a relevance weight for the event (e.g., by summing numerical weighted values of the event attributes to result in an overall relevance weight value for the event). Events can be displayed in the news feed according to relevance, where events with greater relevance can be displayed prominently in the news feed, such as near the top of the news feed or at the beginning of a list of events, before other events with lesser relevance.

As shown in FIG. 4, event E(2) has a greater relevance weight (high 431) than event E(N) (moderate 432), and thus the entry for event E(2) is displayed above the entry for event E(N). A user can assign relevance values to attributes or such relevance values can be pre-defined by the social file storage module. In one embodiment, event entries can be displayed in chronological order (i.e., the order in which the events occurred), and an associated relevance weight can be displayed in the event entry (e.g., as an icon indicating the relevance weight or by displaying differently weighted entries in different colors, styles, or sizes of text).

Each event entry also includes a user 320, which identifies the user who performed the event (i.e., object access), and an operation 325, which identifies the particular operation performed (e.g., read, write, copy). A user 320 can be displayed as a globally unique identifier (GUID) of the user, as a user name 321 or 322 associated with the user, or as a human name of the user (not shown). In one embodiment, a profile picture associated with the user can also be displayed. An operation 325 can be displayed as the identified operation (e.g., a user performed "a write operation" on a file), or can be displayed as a user-friendly description of the operation (e.g., a user "updated" a file). Examples of user-friendly descriptions are shown in entries for events E(2) and E(N), where a write operation is described as an update 326 and a read operation is described as a view 327, respectively. Thus, the users of events E(2) and E(N) have updated and viewed a file, respectively. Such user-friendly descriptions are not limited to these particular examples.

Each event entry also includes an object name 420 of the object that was accessed. Object name 420 identifies a name of the object that was accessed, such as a file name. Object name 420 can be determined from object pathname 305, which provides the location of the object (e.g., a fully qualified path or a universal resource locator (URL) for the object). Object name 420 can be displayed as the object name or can be displayed as the full object pathname 305. Event E(2) illustrates an example of a file name including document type 421, and event E(N) illustrates an example of a folder name 422. As discussed above, the news feed only displays events that pertain to objects to which the user has access. Thus, object name 420 can be displayed as a hyperlink that enables access to the object by referencing the object pathname 305. In response to a user clicking on the hyperlink, interface display module 225 can generate a request on behalf of the user to open the object and can communicate the request to the network share in which the object is stored. The object can be opened in a pop-up window of the social file storage interface on the client device of the user or can opened via a file manager application, such as Windows Explorer. Thus, a user can view the news feed for recent relevant events, can see that an object has been updated by a user, and can click on the object hyperlink to open the object from the social file storage interface.

Each event entry also includes a time stamp 330 or other identifier indicating when the event occurred. The time stamp 330 can be displayed as a time and date, or can be displayed as a time difference between the present time and the time when the event occurred. Event E(2) illustrates an example of a time and date 331, while event E(N) illustrates a time difference 332. In one embodiment, a time difference can be displayed for events that have occurred within the last 24 hours, while the time and date can be displayed for events that have occurred beyond the last 24 hours but within the relevance period (e.g., have occurred in the last two to seven days). Each event entry can also include other available event information not shown in FIG. 4, such as the object type of the object accessed, the IP address of the client device which accessed the object, and an identification or name of the network share in which the object is stored.

Figure 5:
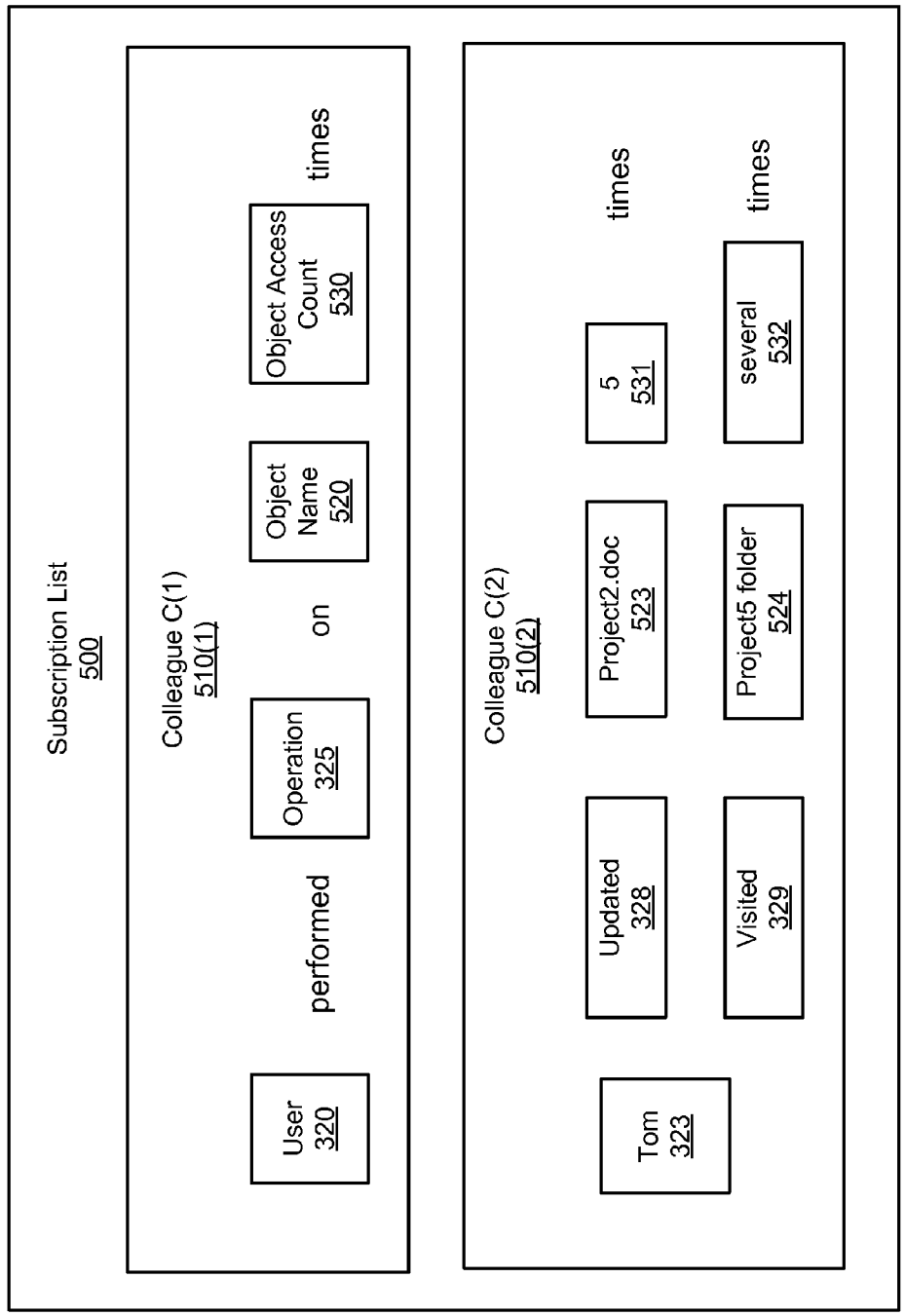
FIG. 5 is a block diagram illustrating relevant components of an example subscription list of a social file storage interface, according to one embodiment.

FIG. 5 is a block diagram illustrating relevant components of an example subscription list 500 of a social file storage interface. A subscription list can include a list of colleague summaries. Each colleague summary entry 510 provides information about events performed by a relevant colleague. Each colleague summary entry 510 can include a user 320, which identifies the relevant colleague. A user 320 can be displayed as a globally unique identifier (GUID) of the colleague or as a user name 323 associated with the colleague. In one embodiment, a profile picture associated with the user can also be displayed.

Events can be aggregated for each relevant colleague in a colleague summary entry, where the colleague summary entry includes an aggregated event summary for each object accessed by the relevant colleague. Each aggregated event summary can include an operation 325, which identifies the particular operation performed (e.g., read, write, copy). An object can be accessed via several different types of operations (e.g., read, write), and an aggregated event summary is generated for each type of operation (e.g., an aggregated event summary for read operations performed on the file, and an aggregated event summary for write operations performed on the file). An operation 325 can be displayed as the identified operation (e.g., user performed "a write operation" on a file), or can be displayed as a user-friendly description of the operation (e.g., a user "updated" a file). Examples of user-friendly descriptions are shown in two aggregated event summaries of colleague summary entry C(2), where a write operation is described as an update 328 and a read operation is described as a view 329, respectively. The colleague of colleague summary C(2) has thus updated and viewed Project2.doc 523 and Project5 folder 524, respectively. Such user-friendly descriptions are not limited to these particular examples.

Each aggregated event summary also includes an object name 520 of the object that was accessed. Object name 520 identifies a name of the object that was accessed, such as a file name or a folder name. Object name 520 can be determined from object pathname 305. Object name 520 can be displayed as the file name or can be displayed as the full object pathname 305. As discussed above, the subscription list, and thus each aggregated event summary, only displays events that pertain to objects to which the user has access. Similarly, as discussed above with reference to the news feed, object name 520 can be displayed in an aggregated event summary as a hyperlink that enables access to the object, where a user can click on the hyperlink to access the object.

Each aggregated event summary also includes an object access count 530 that indicates a total number of times the colleague has performed the operation 325 on the object (e.g., file or folder) of object name 520. For each aggregated event summary of a relevant colleague, a relevant colleague and object pair is created, such as by using the GUID of the colleague and object name 520 of the object (e.g., a file name or a folder name). The colleague/object pair can be used to lookup an associated object access count from an object access count table. As discussed above, object access counts can also be specified for each type of operation performed on the object. An object access count 530 associated with the colleague/object pair and the operation 325 can be retrieved from the table and displayed in the aggregated event summary for the object. If the object access count is not specified for each type of operation 325, but instead is provided as a total number of accesses, the user-friendly description of operation 325 may be displayed as "accessed." For example, an aggregate event summary can display that a colleague has accessed an object a total number of times (rather than having specifically updated or viewed the object). An object access count can also be used as relevance criteria to identify objects to be displayed in the social file storage interface.

The object access count 530 can be displayed as a number value of the total number of accesses or as a general description of the number value (e.g., several times, over 100 times), or as a rate of accesses (e.g., accessed once daily or hourly). Colleague summary entry C(2) illustrates an example of a number value 531 and an example of a general description 532 in two aggregated event entries.

Figure 6A:
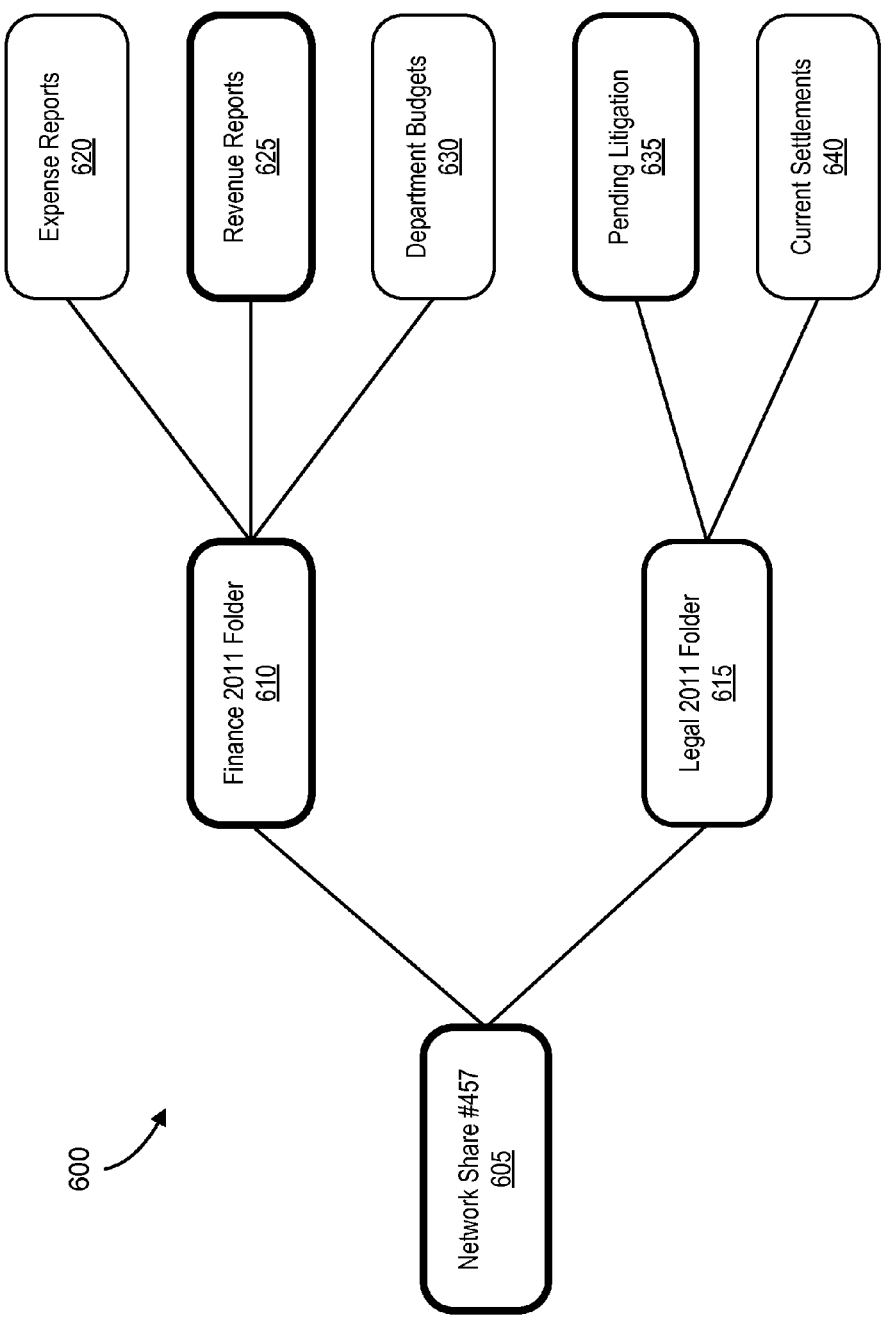
FIG. 6A is a block diagram illustrating relevant components of an example access map implemented with a tree view, according to one embodiment.
Figure 6B:
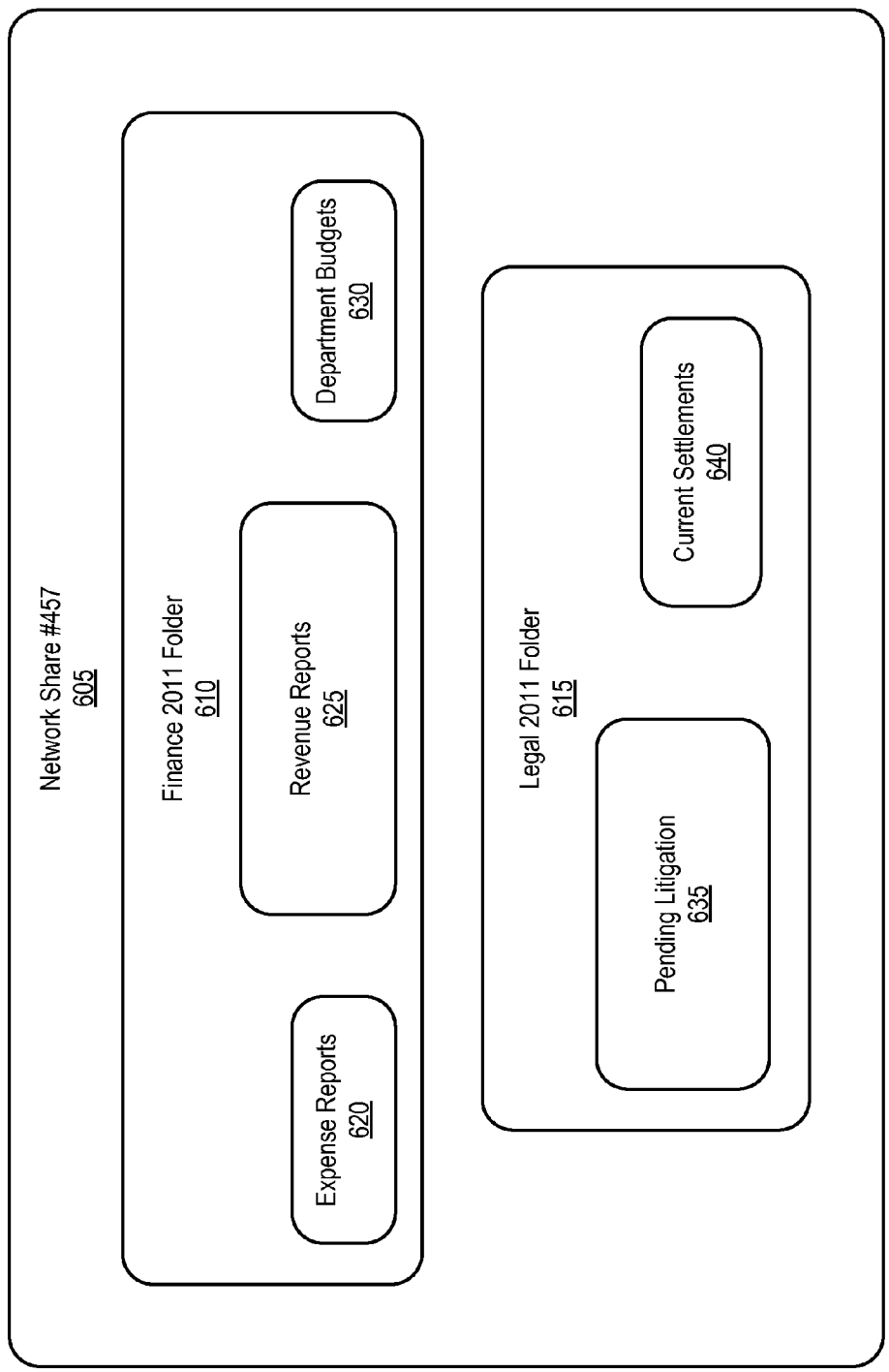
FIG. 6B is a block diagram illustrating relevant components of an example access map implemented with icons, according to one embodiment.
Figure 6C:
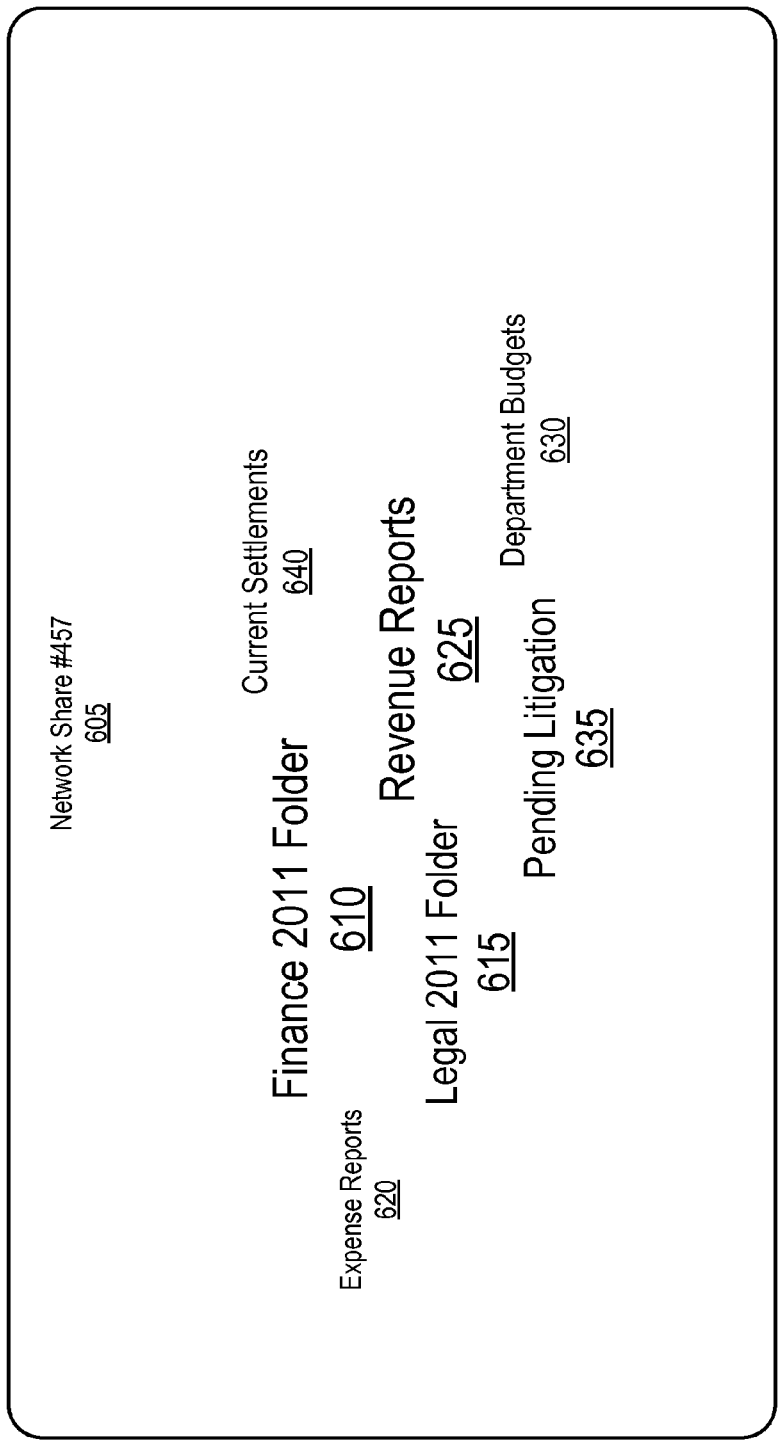
FIG. 6C is a block diagram illustrating relevant components of an example access map implemented with a word cloud, according to one embodiment.

FIG. 6A-6C provide block diagrams illustrating relevant components of an example access map of a social file storage interface. An access map can display a visual representation of relevant object accesses (i.e., events) performed in a file system. Relevant object accesses can be aggregated for each object (e.g., file or folder), where the access map displays a visual representation of all object accesses performed on the object. A total object access count can be determined for an object by aggregating all object access counts of the object across all users. In other words, a total object access count for an object can be determined by summing all object access counts associated with the object, regardless of the colleagues who are also associated with the object access counts. The access map can also display the visual representation of relevant object accesses grouped according to network share, where each relevant object access corresponds to a network share that stores the object of the relevant object access.

A user can define relevance criteria for the access map to identify the user himself as a relevant colleague. Thus, object accesses performed by the user (i.e., the user viewing the social file storage interface him- or herself) can be determined by the comparison module to be relevant events and can be recorded in the event store. Event management module 215 can also log object accesses performed by the user and similarly increment and decrement an object access count for each object accessed by the user. If the user does not identify himself as a relevant colleague in the access map relevance criteria, then the total object access counts do not take the user's object accesses into account when displaying the visual representation of relevant object accesses performed in a file system (i.e., the total object access counts would reflect the total number of object accesses performed by the relevant colleagues, excluding the user). All colleagues can be the union of all users that have accessed an object.

A graphical object is generated for each object, where the graphical object corresponds to the total object access count of the object. In other words, each graphical object represents all object accesses related to the object (i.e., all object accesses performed on the object). A visual representation distinguishes between varying object access count values of an object by using a visual property of a graphical object to signify different object access count values. For example, a visual property can display different colors to signify different ranges of object access count values, such as red, orange, and yellow corresponding to high, medium, and low ranges of object access count values. Thus, a red graphical object indicates an object that has been heavily accessed (i.e., the object has an object access count that falls within the high range) and emphasizes the object from other less accessed objects. Various visual properties can be used to signify different ranges or different sizes of object access count values.

A threshold value of object access counts can be defined by the user or pre-defined by the social file storage module, where objects that do not meet the threshold value (i.e., objects that possess an object access count less than the threshold value) are not displayed in the visual representation. A threshold may be a value (e.g., a numerical value) or a percentage (e.g., a folder must receive at least 1% of all events for that network share in order to be represented in the access map). As discussed above, the access map only displays events that pertain to objects to which the user has access. Objects that the user is not authorized to access will not be represented in the visual representation.

FIGS. 6A, 6B, and 6C illustrate an access map 600 displaying graphical objects that correspond to object access counts of various objects. A network share #457 605 contains at least two folders, Finance 2011 Folder 610 and Legal 2011 Folder 615. Finance 2011 Folder contains at least three files: Expense Reports 620, Revenue Reports 625, and Department Budgets 630. Legal 2011 Folder contains at least two files: Pending Litigation 635 and Current Settlements 640. Revenue Reports 625 and Finance 2011 Folder 610 are heavily accessed objects, Pending Litigation 635 and Legal 2011 Folder 615 are moderately accessed objects, and Expense Reports 620, Department Budgets 630, and Current Settlements 640 are less accessed objects. While other objects may have been accessed on network share #457, the object access count for each of those objects did not meet the threshold value and thus the other objects are not displayed in the access map. Although not shown, access map 600 can also display accessed objects on other network shares, and is not limited to showing objects on a single network share.

FIG. 6A illustrates an access map implemented with a tree view. The access map of FIG. 6A displays each object 610-640, and the network share 605, as a rectangular graphical object. Relationships between objects (e.g., files and folders) are indicated as lines. Border thickness of a graphical object corresponds to the size of the object access count of an object. A thick border denotes objects associated with larger object access counts, and a thinner border denotes objects associated with smaller object access counts. In one embodiment, different colors can be used to indicate corresponding objects that are associated with different ranges of object access counts.

FIG. 6B illustrates an access map implemented with icons. An object is represented by an icon, such as a picture of a file or a folder, or other graphical object. Objects 610-640 and network share 605 are displayed as rectangular icons. The icon size of the icon corresponds to the size of the object access count of the object, where a larger icon denotes objects associated with larger object access counts, and a smaller icon denotes objects associated with smaller object access counts.

FIG. 6C illustrates an access map implemented with a word cloud. In a word cloud, an object is represented by an object name in the word cloud. Objects 610-640 are displayed as corresponding object names. The font size of the object name corresponds to the size of the object access count of the object. A larger object access count indicates a greater number of accesses to the object, and thus indicates an actively used object. A larger font (e.g., 20 pt) denotes objects associated with larger object access counts, and a smaller font (e.g., 12 pt) denotes objects associated with smaller object access counts. In other words, a larger font or bolder coloring indicates objects that are most actively used, and thus are most relevant to a user, in comparison to other objects. Objects 610-640 can be displayed within a graphical object representing network share 605, or network share 605 can also be displayed as a corresponding network share name.

Figure 7:
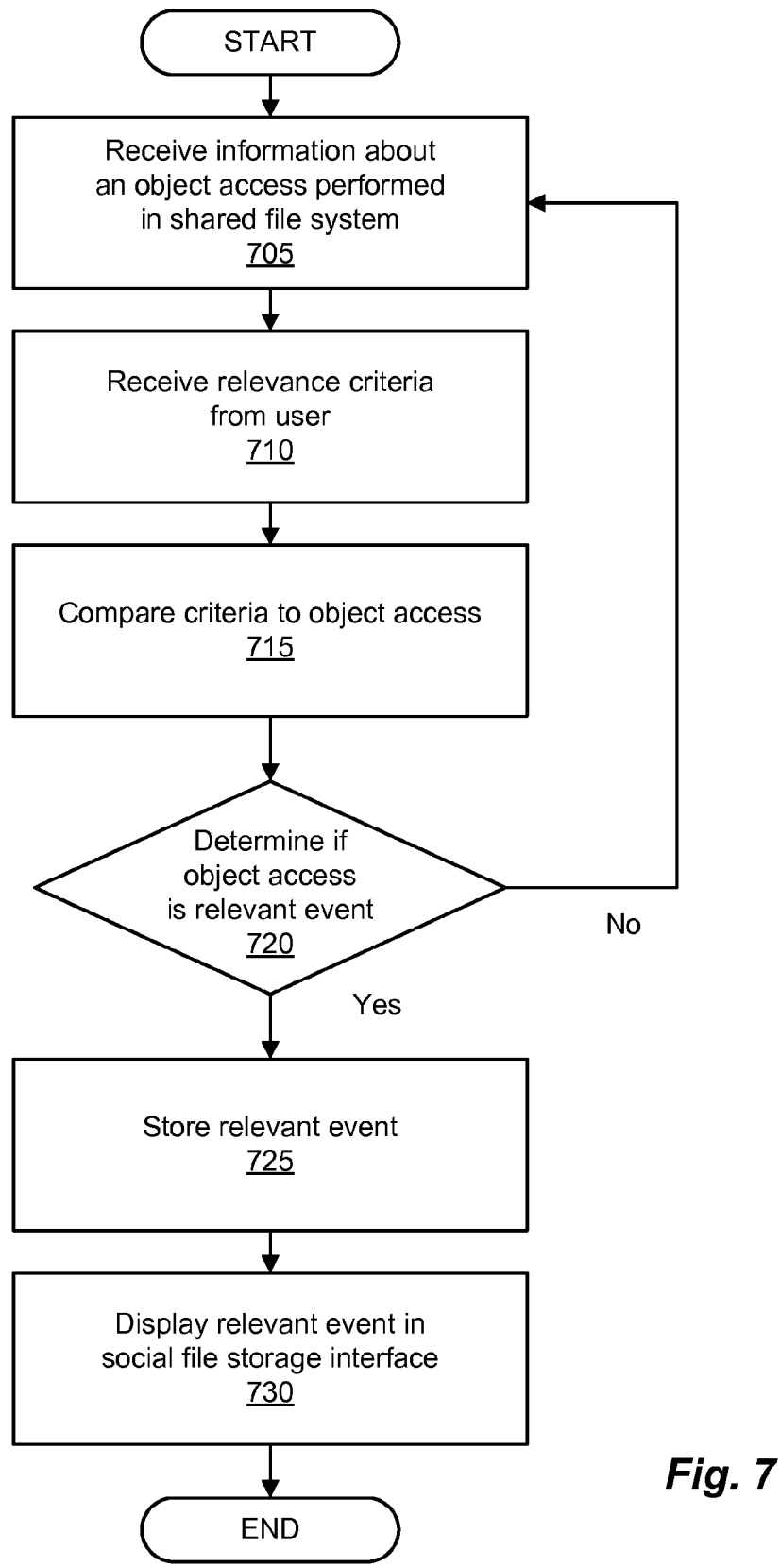
FIG. 7 is a flow chart illustrating relevant acts of an example process implemented by a social file storage interface module, according to one embodiment.

FIG. 7 is a flow chart illustrating a process implemented by a social file storage interface module. The process begins at operation 705, receiving information about an object access performed in a file system. The received information can be captured by a data governance tool and then provided to the social file storage interface in operation 705. The received information can also be received or retrieved from an object access history store. The received information includes attributes of an object access, as discussed above. Social file storage module can monitor a port configured to receive the information, and can detect when the information is received at the port. If no information is received (i.e., no received information is detected at the port), the social file storage module can wait and continue to monitor the port for information. Once information has been received, the process continues to operation 710.

Operation 710 provides for receiving relevance criteria from a user. Relevance criteria can be received on an on-going basis from a user, and stored in a relevance criteria store. While operation 710 is shown to occur after operation 705, operation 710 may occur before operation 705 or both operations 705 and 710 may occur simultaneously. Relevance criteria defined by one or more users can include target attributes of an object access that a user deems relevant, as discussed above. The relevance criteria store can be located locally to the social file storage module.

The process continues to operation 715, comparing relevance criteria to an object access. An object access can be retrieved from an object access history store of the data governance tool. An object access can be temporarily stored in a buffer at the social file storage module during the comparison. Target attributes of the relevance criteria are compared with attributes of an object access.

The process continues to operation 720, determining if the object access is a relevant event. If an attribute of the object access does not match a target attribute of the relevance criteria, the object access is determined to be a non-relevant event, and the process returns to operation 705 to receive information about a next object access. If an attribute of an object access matches a target attribute of the relevance criteria, the object access meets the relevance criteria and is determined to be a relevant event, and the process continues to operation 725. Relevance criteria can be configured as individual criteria (in which case, satisfaction of any one criterion results in a relevant event), or as a combination of criteria (in which case, satisfaction of the combination of criteria results in a relevant event).

Operation 725 provides for storing the relevant event. Attributes of the relevant event are stored in an event store. A criteria ID, or indication of the matched relevance criteria, associated with the relevant event can also be stored in the event store. The relevant event, or relevant object access, can also be logged by the social file storage module by incrementing an object access count for the object accessed in the event. An object access count is a running total of the number of accesses of the object. The object access count can be stored in an object access count table. A colleague/object pair can also be stored with an associated object access count in the table. Once an event expires and is removed from the event store, the object access count is decremented for the object accessed in the event.

The process continues to operation 730, displaying relevant events in the social file storage interface. The social file storage module is configured to access the event store and display the events in one of three functionalities of the social file storage interface, according to the criteria ID associated with each event. The events can be displayed in the social file storage interface in response to a user request to open the social file storage interface at a client device. Access permissions of the user are checked to verify that the user has authority to access the object of the object access. Although an object access can be determined to meet the relevance criteria of a user, the object access is not displayed in the social file storage interface if the user does not have authority to access the object.

Although the process is illustrated as ending after operation 730, the process of FIG. 7 may repeat while a user is viewing the social file storage interface. For example, the social file storage module can continue to receive information about object accesses and compare the object accesses to relevance criteria while the social file storage interface is open on the client device. The social file storage interface can be updated with new events as the events occur in real time (or near real time, taking network transmission delays and processing delays into account), where the social file storage module updates the social file storage interface with new relevant events.

Thus, the present disclosure provides a way to display many of the interesting and informative events that happen on file systems, as well as hide superfluous file and folder events. Notifying a user of informative events, such as when a modification is made to a document or other file, can be especially beneficial when the sheer number of changes made to one or more files prohibits enumeration of all such changes via electronic mail, or other person-to-person communication medium. A user can tailor the events displayed in the social file storage interface using relevance criteria that identify colleagues, files, and folders in which the user is interested. A user can also filter out or exclude other events that the user does not find interesting or relevant. The social file storage interface can alert other interested colleagues about a newly created object, even when the creator of the object has forgotten to disclose the object's existence to the colleagues. The social file storage interface provides information about the object and where it is located in the news feed or subscription list. The social file storage interface especially provides this benefit to users in colloquium and seminar settings, where colleagues want to be made aware of work accomplished by others, but do not maintain consistent communication with one another. Users of the social file storage interface can also benefit from implementing the social file storage interface using information provided by a shared file system. Since files can be accessed by multiple users in a collaborative manner in shared file systems, the information recorded by a shared file system can include information about accesses performed by multiple users to a single file, in addition to accesses performed by a single user to multiple files. Thus, the information provided by a shared file system to the social file storage interface especially benefits a user who wishes to track collaborative accesses to a single file.

Figure 8:
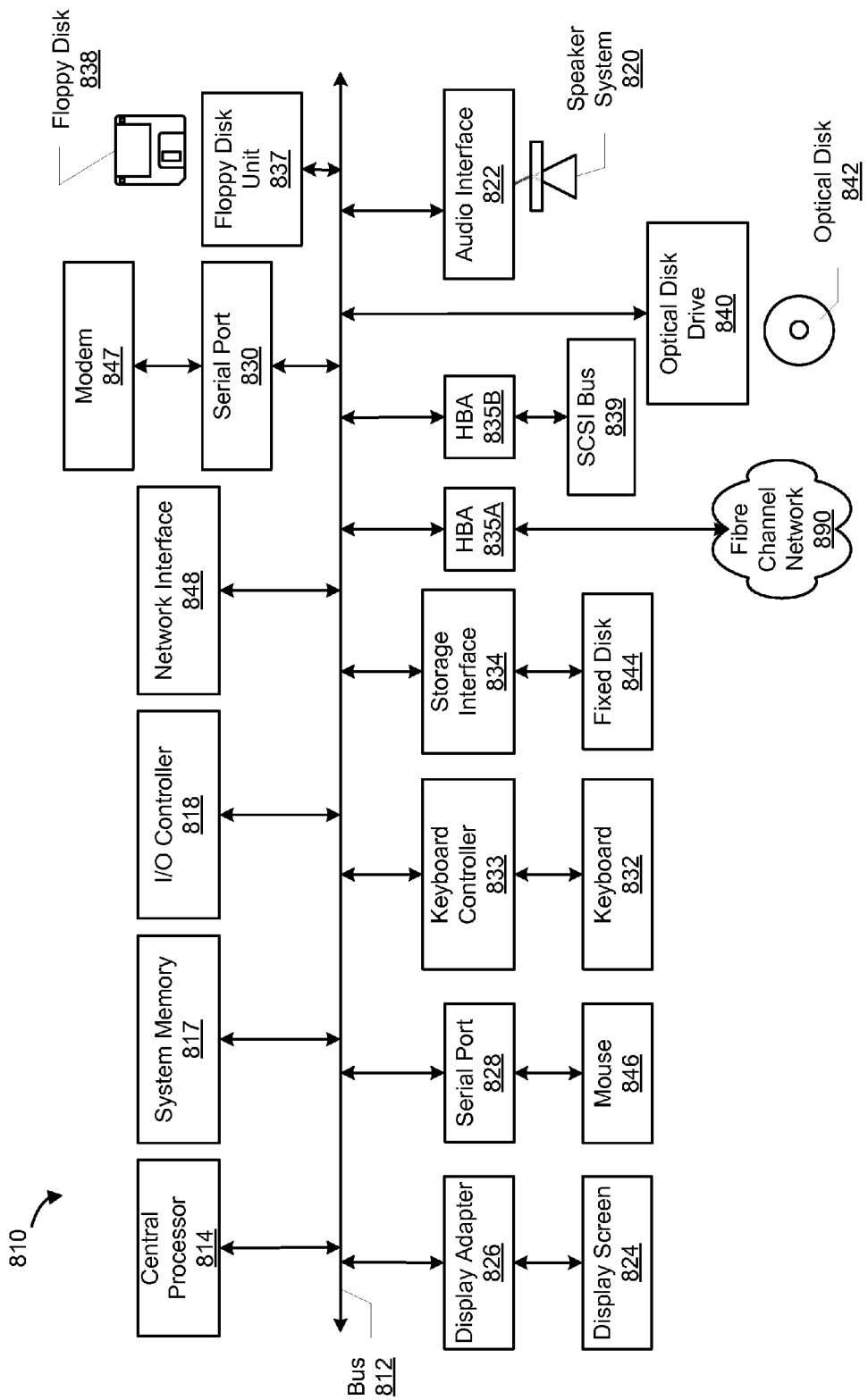
FIG. 8 is a block diagram illustrating relevant components of an example computer system suitable for implementing embodiments of the present application.

FIG. 8 is a block diagram that illustrates an example of a computer system 810 that is suitable for implementing the present disclosure. Computer system 810 may be illustrative of various computer systems in the storage system 100, such as system(s) 110, 120, and/or 150, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
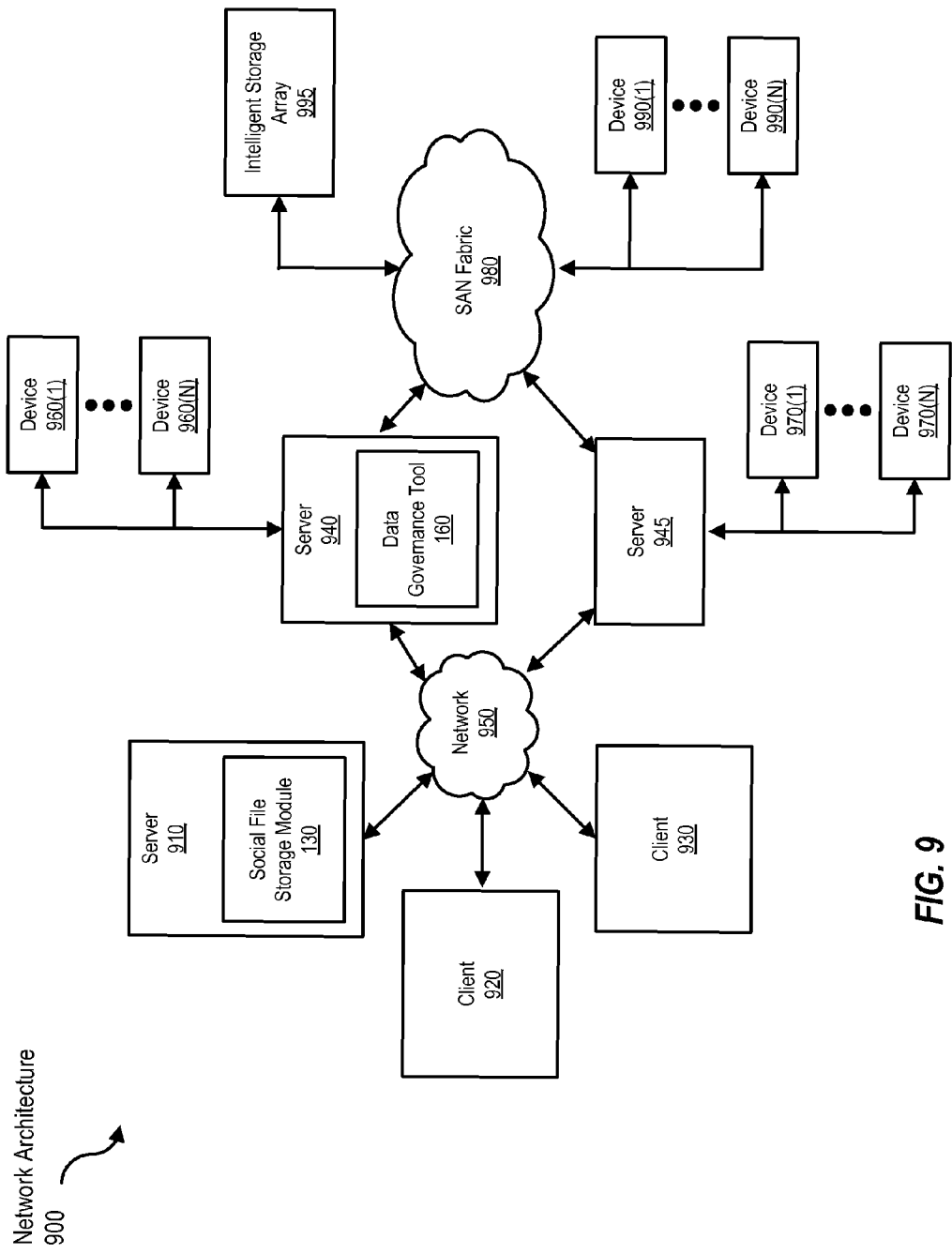
FIG. 9 is a block diagram illustrating relevant components of an example computer system suitable for implementing embodiments of the present application.

FIG. 9 is a block diagram of a network system 900 in which client systems 920 and 930 and servers 910, 940, and 945 can be coupled to a network 950. Client systems 920 and 930 generally represent any type or form of computing device or system, such as client systems 110 in FIG. 1 or computer system 810 in FIG. 8.

Similarly, servers 910, 940, and 945 generally represent computing devices or systems, such as application servers or database servers, configured to provide various database services and/or run certain software applications, such as servers 120 and 150 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, client systems 920 and/or 930 and/or servers 910, 940, and/or 945 can include a social file storage module 130, as shown in FIGS. 1 and 2, and/or a data governance tool 160, as shown in FIG. 1.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 910, 920, and 930 and network 950. Client systems 910, 920, and 930 can be able to access information on server 940 or 945 using, for example, a web browser or other client software. Such software can allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in server 940, run by server 945, and distributed to client systems 910, 920, and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a social file storage module 130 in FIG. 1 can transform information received from a file system into a visual representation of accesses performed in the file system.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
    receiving, at a server, information about an object access of an object, wherein the object access is performed by a first user;
    determining, by the server, whether the object access meets relevance criteria provided by a second user, wherein
        the relevance criteria indicates whether to display the information about the object access to the second user in one or more particular views of a plurality of predefined views; and
    in response to a determination that the object access meets the relevance criteria,
        generating a criteria identifier (ID), wherein
            the criteria ID comprises a user ID and a display functionality ID,
            the user ID identifies the second user, and
            the display functionality ID identifies the one or more particular views of the plurality of predefined views to be used to display the information about the object access to the second user, accessing information related to object accesses of the object,
comparing the information related to the object accesses of the object with a threshold, and
in response to a determination that the threshold has been met or exceeded, displaying the information about the object access in a user interface for viewing by the second user.

2. The method of claim 1, further comprising:
comparing the relevance criteria with the information about the object access, wherein,
the information about the object access comprises attributes of the object access, and
the relevance criteria comprises target attributes of a relevant event.

3. The method of claim 2, wherein
the target attributes of the relevance criteria comprise at least one of a user name and an object name, and
the object name comprises one of a file name and a folder name.

4. The method of claim 1, wherein
the object comprises a file stored in a network share, and
the information about the object access is gathered from a file system that resides on the network share.

5. The method of claim 1, wherein the displaying further comprises:
determining that the second user is authorized to view the object of the object access, based on the user ID; and
determining a display functionality of the user interface used to display the information about the object access, based on the display functionality ID.

6. The method of claim 5, wherein the displaying further comprises:
in response to the display functionality ID identifying a news feed functionality:
displaying the information about the object access in a news feed view of the user interface, wherein
the information is displayed in a list of the news feed view, in order of a relevance value of the object access, and
the relevance value is determined using the information.

7. The method of claim 5, wherein the displaying further comprises:
displaying the information about the object access in a subscription list view of the user interface, in response to the display functionality ID identifying a subscription list functionality, wherein
the subscription list view comprises an aggregated event summary, and the aggregated event summary comprises
a file name of the object,
a colleague user identifier that identifies the first user, and
an operation identifier that indicates the object access is one of a particular type of operation performed on the object.

8. The method of claim 5, further comprising:
in response to the determination that the object access meets the relevance criteria,
incrementing a count associated with the object of the object access, wherein
the count indicates a total number of object accesses related to the object; and
wherein the displaying further comprises:
in response to the display functionality ID identifying an access map functionality, displaying a graphical object in an access map view of the user interface, wherein
the graphical object represents the object of the object access, and
a visual property of the graphical object corresponds to the count.

9. The method of claim 1, further comprising:
storing the information about the object access as information about a relevant event in an event store, in response to the determination that the object access meets the relevance criteria.

10. The method of claim 4, wherein
the user interface is configured to display a hyperlink that provides access to the object of the object access,
the hyperlink comprises storage location information used to access the object, and
the storage location information comprises a pathname of the file on the network share.

11. An apparatus, comprising:
a processor; and
a memory coupled to the processor and configured to store instructions executable by the processor, the instructions configured to implement
a comparison module configured to
receive information about an object access of an object, wherein
the object access is performed by a first user,
determine whether the object access meets relevance criteria provided by a second user, wherein the relevance criteria indicates whether to display the information about the object access to the second user in one or more particular views of a plurality of predefined views, and
in response to a determination that the object access meets the relevance criteria,
generate a criteria identifier (ID), wherein
the criteria ID comprises a user ID and a display functionality ID,
the user ID identifies the second user, and
the display functionality ID identifies the one or more particular views of the plurality of predefined views to be used to display the information about the object access to the second user,
access information related to object accesses of the object, and compare the information related to the object accesses of the object with a threshold; and
an interface display module configured to
display the information about the object access in a user interface for viewing by the second user, in response to a determination that the threshold has been met or exceeded.

12. The apparatus of claim 11, wherein the comparison module is further configured to
compare the relevance criteria with the information about the object access, wherein,
the information about the object access comprises attributes of the object access, and
the relevance criteria comprises target attributes of a relevant event.

13. The apparatus of claim 12, wherein
the target attributes of the relevance criteria comprise at least one of a user name and an object name, and
the object name comprises one of a file name and a folder name.

14. The apparatus of claim 11, wherein
the object comprises a file stored in a network share, and
the information about the object access is gathered from a file system that resides on the network share.

15. The apparatus of claim 11, wherein the interface display module is further configured to
determine that the second user is authorized to view the object of the object access, based on the user ID, and
determine a display functionality of the user interface used to display the information about the object access, based on the display functionality ID.

16. The apparatus of claim 15, further comprising:
an analysis module configured to determine a relevance value of the object access, wherein
the relevance value is determined using the information; and
wherein the interface display module is further configured to
display the information about the object access in a news feed view of the user interface, in response to a news feed functionality identified by the display functionality ID, wherein
the information is displayed in a list of the news feed view, in order of the relevance value of the object access.

17. The apparatus of claim 15, wherein the interface display module is further configured to
display the information about the object access in a subscription list view of the user interface, in response to a subscription list functionality identified by the display functionality ID, wherein
the subscription list view comprises an aggregated events summary, and
the aggregated event summary comprises
a file name of the object,
a colleague user identifier that identifies the first user, and
an operation identifier that indicates the object access is one of a particular type of operation performed on the object.

18. The apparatus of claim 15, further comprising:
an event management module configured to
increment a count associated with the object of the object access, in response to the determination that the object access meets the relevance criteria, wherein
the count indicates a total number of object accesses related to the object; and
wherein the interface display module is further configured to
display a graphical object in an access map view of the user interface, in response to an access map functionality identified by the display functionality ID, wherein
the graphical object represents the object of the object access, and a visual property of the graphical object corresponds to the count.

19. The apparatus of claim 11, further comprising:
an event management module configured to
store the information about the object access as information about a relevant event in an event store, in response to the determination that the object access meets the relevance criteria.

20. A system, comprising:
a client computer coupled to a network, the client computer configured to provide relevance criteria, wherein the relevance criteria indicates whether to display the information about the object access to a second user in one or more particular views of a plurality of predefined views; and
a server computer coupled to the network, the server computer configured to
receive information about an object access of an object, wherein
the object access is performed by a first user,
determine whether the object access meets the relevance criteria, and
in response to a determination that the object access meets the relevance criteria,
generate a criteria identifier (ID), wherein
the criteria ID comprises a user ID and a display functionality ID,
the user ID identifies the second user, and
the display functionality ID identifies the one or more particular views of the plurality of predefined views to be used to display the information about the object access to the second user,
access information related to object accesses of the object,
compare the information related to the object accesses of the object with a threshold, and
in response to a determination that the threshold has been met or exceeded, display the information about the object access in a user interface for viewing by the second user.

21. The method of claim 1, wherein
the information related to the object accesses of the object comprises a count value, and
the count value indicates a total number of object accesses of the object.

* * * * *